Figure 1:
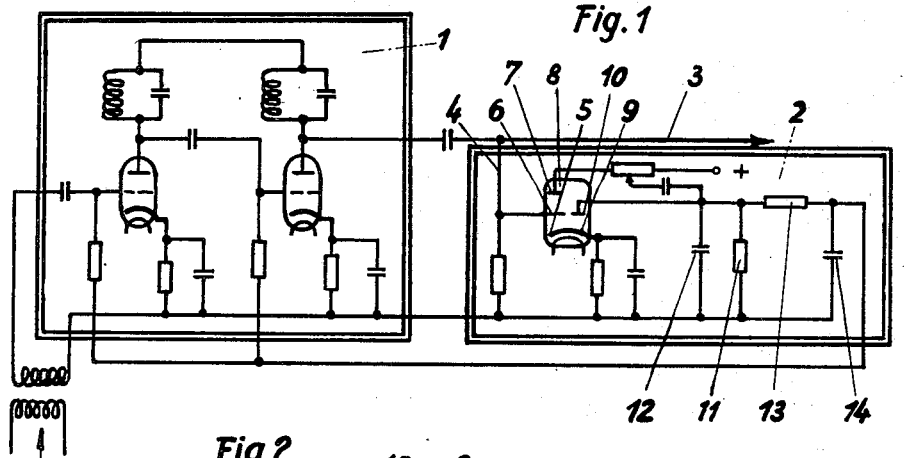

Sept. 14, 1943.   R. WELLENSTEIN ET AL   2,329,570
DEVICE FOR REGULATING THE SENSITIVITY OF SIGNAL RECEIVING APPARATUS
Filed April 4, 1940   2 Sheets-Sheet 1

Inventors,
R. Wellenstein
W. Holle
M. Schumacher
By: Hascock Downing & Seebold
Attorneys.

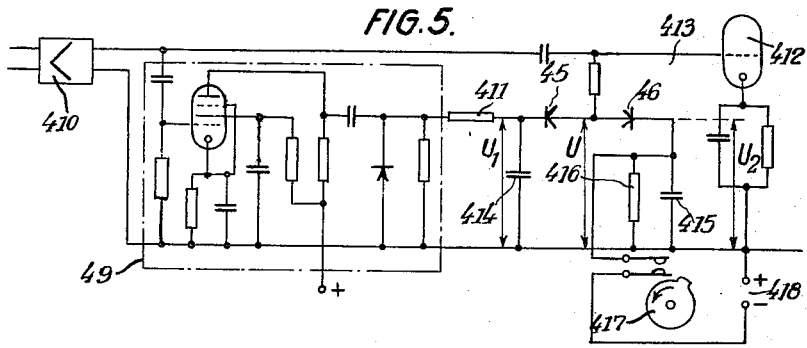
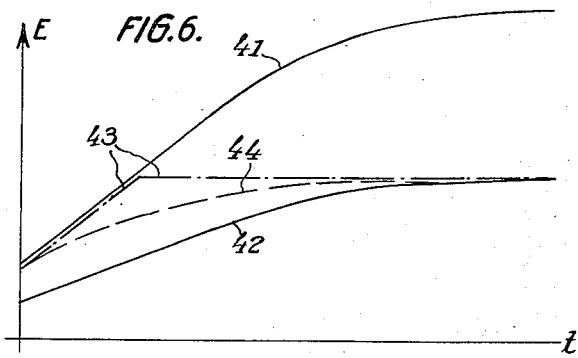
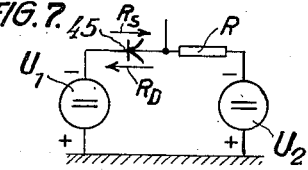

Patented Sept. 14, 1943

2,329,570

UNITED STATES PATENT OFFICE 2,329,570

DEVICE FOR REGULATING THE SENSITIVITY OF SIGNAL RECEIVING APPARATUS

Robert Wellenstein, Werner Holle, and Martin Schumacher, Bremen, Germany; vested in the Alien Property Custodian Application April 4, 1940, Serial No. 327,914
In Germany March 27, 1939

4 Claims. (Cl. 179—171)

In transmitting signals by undulations in a medium, the principal difficulty consists in obtaining with a highly sensitive receiver a reception which is clear of disturbances. As the cause of disturbances is mostly subject to greater or smaller fluctuations which are incalculable, the sensitivity of the majority of the signal receiving plants is increased by turning on the receiving amplifier to such a degree that on the one hand the signals are received with the necessary intensity, but so that on the other hand the limit of respondence remains above the intensity of the disturbances. If, in case of fluctuations of the intensity of the disturbances, any disturbances are received, the amplification is reduced by hand sufficiently to let the disturbances disappear. Where it is not possible to effect such a manual regulation, for example in echo sounding instruments of airplanes, the disturbances were made ineffective by reducing the sensitivity of the receiver sufficiently to have the limit of respondence with certainty above the highest intensity of the disturbances to be expected. But, of course, this is connected with the disadvantage that it is mostly necessary to operate with a smaller intensity than that obtainable when making allowance for the intensity of the disturbances. This is especially disadvantageous in cases where the intensity of the disturbances is subject to great fluctuations of the amplitude as, for example, in echo sounding instruments of airplanes, where the intensity of the disturbances in travelling flights is a multiple of the intensity of the disturbances when proceeding to land.

The object of the invention is to provide a signal receiving plant, the sensitivity of which is automatically regulated according to the existing intensity of the disturbances, but without thereby removing the reception of the signals.

This has been achieved according to the invention by controlling with delay the sensitivity of the receiving device by means of the level of the disturbances in such a way that an increase of the amplitude of the disturbances causes a decrease of the sensitivity and vice versa, the delay of the regulation being rated so that the signals are not or only partly affected by the decrease in the sensitivity caused. Thus it is possible to always have the sensitivity close to the level of the disturbances without having to fear that the limit of respondence is constantly exceeded with increasing intensity of the disturbances. Consequently, a considerably greater range of action is obtained with the same transmitting power at a low level of the disturbances, as in the case of an airplane starting, then can be obtained with a sensitivity ranging above the maximum level of the disturbances.

Furthermore, the regulation by the level of the disturbances has the advantage that the instrument automatically adapts itself with respect to its sensitivity without special adjustment to the various operating conditions, which is of importance for manufacturing in series and for mounting.

Figure 2:
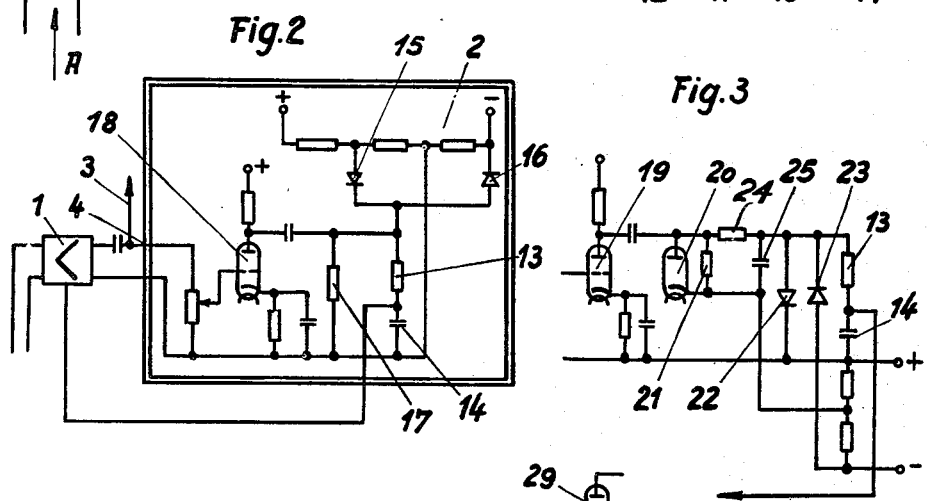
Figure 3:
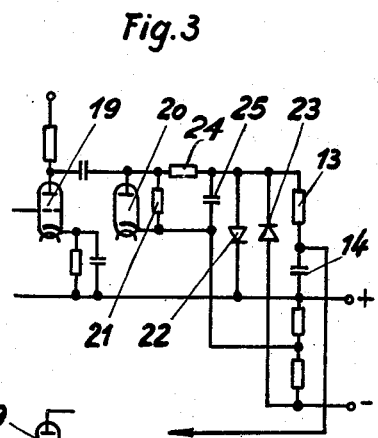
Figure 4:
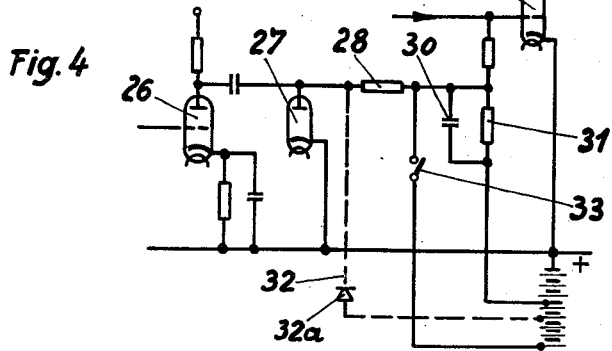

Several constructional examples of the invention are illustrated in the accompanying drawings in which:

Figs. 1 to 3 show three constructional examples for amplifier connections with backward regulation of the amplifier, Fig. 4 shows a constructional example for an amplifier connection with forward regulation, Fig. 5 shows a regulating device for echo sounding with simultaneous regulation of the sensitivity by a time circuit and by the level of the disturbances, Fig. 6 illustrates the action of the simultaneous regulation of the sensitivity by a time circuit and by the level of the disturbances, Fig. 7 shows a modification of the regulating device according to Fig. 5.

Of the entire signalling plant the illustrations only show the amplifier 1 in connection with a regulating device 2.

The signal amplifier 1 with, for example, two stages is connected at the output side by a line 3 to a relay for effecting the indication and by a line 4 to a device for regulating the degree of amplification of the amplifier 1.

The regulating device 2 is constructed so as to generate regulating direct voltage corresponding to the output voltage of the amplifier 1 and being applied as a negative grid bias to the last stage of the amplifier so that, when the receiving amplitude increases, the degree of amplification is automatically reduced sufficiently to keep the output voltages, generated by the level of the disturbances, below the limit of respondence of the relay circuit. Thus, it is attained that the disturbing voltages are kept away with the exception of a harmless residue. In order that the signaling voltages should not be excluded by the regulation, the regulating device is provided with a lagging device to cause a delayed action of the regulating voltage generated by the signals so that the signal itself, which normally has a duration of about 0.015 sec., is not or only partly affected by the reduction of the sensitivity it causes.

In the constructional example according to Fig. 1 the regulating device consists of a further amplifier stage formed by a triode 5, 6, 7 of a compound tube 8 and a rectifier formed by the diode 9, 10 of the compound tube. The direct voltage appearing at the anode resistance 11 of the rectifier 9, 10 without delay according to the respective amplifier output voltage and being smoothed by the condenser 12 is applied via the lagging device consisting of a resistance 13 and a condenser 14 as a negative regulating voltage to the grid circuits of the two amplifier stages.

The amplifier stage of the regulating device may be constructed so as to be controlled by amplifier output voltages exceeding the maximum amplitude of the level of the disturbances, whereby the regulating range may be limited downwards in a suitable manner.

At A it is indicated how the echo impulse is conducted from the receiver to the amplifier 1.

Fig. 2 shows a connection in which the rectification in the regulating device is not effected by a diode, but by means of two rectifiers 15 and 16 operating with certain biasing potentials of, for example, +20 and −10 volts with opposite transmitting direction and in shunt connection with an anode resistance 17 of the amplifier tube 18. These rectifiers cause an unsymmetrical limitation of the alternating voltage generated in the anode resistance 17, so that this voltage has a mean value of direct voltage corresponding to the dissymmetry. The unsymmetrical alternating voltage or its mean value of direct voltage existing at the anode resistance acts via the resistance 13 and the condenser 14 as a regulating voltage upon the amplifier 1.

By the unsymmetrical biasing rectifiers 15 and 16 a limitation of the amplitude and, therefore, also a limitation of the regulating range upwards as well as downwards is obtained.

Fig. 3 shows a connection in which, as in Fig. 1, first an amplification in a tube 19 and then a rectification in a diode 20 is effected. The voltage, thus rectified, lying at the anode resistance 21 is limited upwards and downwards in a corresponding way as the alternating voltage in Fig. 2 by two shunts with biasing rectifiers 22 and 23. This is effected by the rectifiers together with a resistance 24 and a smoothing condenser 25, from which the regulating voltage is derived and is then conducted via the resistance 13 and the condenser 14 to the amplifier 1.

Instead of the backward regulation illustrated in Figs. 1 to 3, a forward regulation may be provided, for example, as illustrated in Fig. 4. In this case, the amplifier output voltage, which is amplified in an amplifier tube 26 and which is rectified in a diode 27, is conducted via a resistance 28 to a condenser 30, with a parallel discharging resistance 31, in the grid circuit of a relay tube 29. As indicated by the dashed line 32, a limitation of the regulating range may, in this case too, be provided by arranging a shunt to the diode with a corresponding biasing rectifier 32a.

At the same time, there is arranged a time regulation of the sensitivity by bringing the condenser 30 upon sound emission by means of a contact 33 to a certain negative voltage, then gradually discharged via the resistance 31 until the next sound emission, so that the sensitivity gradually rises from a minimum value at the sound emission to a maximum value. This maximum value is given by the regulating voltage, which is conducted to the condenser 30 from the diode 27.

With simultaneous regulation of the sensitivity of a receiver for echo sounding by a time circuit and by the level of the disturbances, it is possible to let the voltage of the time circuit and the regulating voltage, generated by the level of the disturbances, act at separate places or in different stages upon the receiver. In Fig. 6 the curve 41 is to illustrate the course of the sensitivity E in dependence of the time $t$ with a small disturbing voltage. If, for example, a strong disturbing voltage regulates one stage of the receiver amplifier down to one half, curve 41 will become curve 42. But such an effect is neither required nor desired for removing the disturbance. It is sufficient for suppressing the disturbance to avoid an increase of the sensitivity above a certain limit determined by the level of the disturbances. In case of small distances, the disturbances are, in general, effectively suppressed by the time circuit. Although, in order to avoid the indication of disturbances, it would be possible to do without the time circuit in case of regulation by the level of the disturbances, the time circuit is generally necessary for suppressing the direct sound and for avoiding overlapping of the indication, i. e. an indication of echoes of the preceding sounding period.

In order, on the one hand, to positively suppress the sound at zero with a low level of disturbances and to prevent overlapping of the indication, and on the other hand to secure the indication of echoes returning from a short distance with a high level of disturbances, it is not an advantage to reduce the sensitivity in the already low linear bottom part of the sensitivity curve 41, and a course according to curve 43 or at least according to curve 44 should be aimed at. This may be accomplished by using only one, or to a great extent one, of the various simultaneously existing regulating voltages and, in the present example, the highest one for the regulation, whereas the lower regulating voltage is stopped by the higher one or otherwise prevented from influencing the circuit to be regulated.

Fig. 5 shows a connection which satisfies these requirements for the simultaneous regulation of the sensitivity by means of a time circuit and the level of disturbances. For regulation by means of the level of disturbances, a regulating direct voltage corresponding to the output voltage of the disturbance is generated in an amplifier rectifier 49 which is connected to the output of the amplifier 410 or to a stage of the amplifier. This regulating direct voltage is conducted via a resistance 411 as a negative regulating voltage to a condenser 414 in the grid circuit 413 of the next stage of the amplifier or of the relay tube 412.

For the time regulation there is provided in the grid circuit 413 of the tube 412 a second condenser 415 with a parallel discharging resistance 416. By means of a cam disc 417 the time circuit condenser 415 is for a short period connected to a source of charging current 418 upon sound emission and is thereby charged with the voltage of this source of current, then being discharged via the resistance 416 according to a certain time constant.

The two negative regulating voltages $U_1$ and $U_2$ generated at the condensers 414 and 415 respectively are connected via current and voltage dependent resistances, for example rectifiers 45 and 46, to a common point, whose potential $U$ is applied to the circuit to be regulated, for example to the grid of the amplifier or relay tube 412. The potential $U$ serving for regulation is either equal to $U_1$ or to $U_2$, always being equal to the higher of the two regulating voltages. By the connection in opposition of the two rectifiers 45 and 46, a blocking resistance is placed between the two voltages $U_1$ and $U_2$ so that they do not influence each other or at least not to a noticeable extent.

One of the two rectifiers, for example the rectifier 46, may, as illustrated in Fig. 7, be replaced by an ohm resistance R. The effect of the connection is not materially influenced if the resistance R is chosen so as to be very much smaller than the blocking resistance Rs of the remaining rectifier 45 and very much greater than the conductive resistance $R_D$ of this rectifier, thus complying with the condition $$R_s >> R >> R_D$$

Naturally, the invention is not restricted to the examples illustrated, various modifications and other constructions being possible. In the examples illustrated, the delay as a mean value covers a greater period, comprising a multiple of the duration of the signal. The signals are also partly affected by the decrease of the sensitivity caused by them. This may be avoided by constructing the regulating device so that the delay only appears as a shifting in the time of the influences upon the sensitivity with respect to the fluctuations of the level of disturbances or of the receiving amplitude caused thereby, which at least equals the duration of one signal. At the same time, the level of disturbances may be smoothed in order not to let any short fluctuation of the level of disturbances cause a corresponding alteration of the sensitivity.

In some cases, especially in echo sounding with a transmitting device controlled by the arriving echoes, it is important that the respondence of the receiving device caused by a sudden rise of the level of disturbances should be made harmless as far as possible. For this purpose, a device may be provided which, upon arrival of successive impulses at different times after emission of the sounding impulse, causes a delay of the sounding, for example by means of a corresponding voltage difference. Instead of regulation by tubes, the sensitivity may be influenced otherwise, for example by mechanical means. For example, a potentiometer may be inserted in the amplifier branch, the tap of this potentiometer being adjusted by the output current of the regulating amplifier, for example by a dynamically or magnetically operated system or by means of a motor. Instead of the potentiometer it is also possible to use an adjustable condenser, which either varies the transmitting value according to its conductance or its leakage, or which reduces the sensitivity by detuning a resonant circuit.

Where the actions or devices causing the appearance of the disturbances are known and accessible, the regulation of the sensitivity may be effected by these actions or devices instead of by the disturbances. In this case, a delay would not be necessary, as there is no danger of an automatical regulation by the signals. In airplanes, the regulating device may, for example, be connected with the gas lever. Thus, it is possible to avoid disturbances by sudden increases of the disturbances.

Finally, the invention may be applied to other signalling devices and echo sounding devices, for example for echo sounding on ships.

What we claim, is:

1. In a signal receiving apparatus, means amplifying impulse signals and disturbance waves, grid control means for said amplifier, means providing a negative biasing voltage varying in amplitude with the magnitude of the amplified signal impulses and disturbance waves, means applying said biasing voltage to said grid control means, and means delaying the transmission of the grid control means of each biasing impulse produced by signal impulse so that each biasing impulse does not affect the amplification of said amplifier during the reception of the corresponding signal impulse, the feature for accomplishing this result being the inter-dependency of the biasing circuits and the inclusion therein of devices having opposed elements arranged to increase or decrease the grid bias of the amplifier in response to variations in the magnitude of the disturbance waves and the time period of the signal impulses.

2. In signal receiving apparatus, an amplifier for amplifying signal impulses and disturbance waves, an output circuit for said amplifier, rectifying means connected to said output circuit providing direct current voltage proportional to the amplitude of the amplified impulses and disturbance waves, means including a circuit for controlling said amplifier in accordance with the voltage variation of said direct current to decrease the amplification of the signal impulses and disturbance waves upon a voltage increase of the direct current, and means in said circuit for delaying the application to said control means of each direct current voltage impulse until after the corresponding signal impulse has substantially terminated, said delaying means providing selective control on the grid bias of the amplifier, whereby the noise impulses are ineffective for a time period equal to the duration of the required reception period of the signal impulses.

3. In signal receiving apparatus, a grid control amplifier having an input circuit for receiving signal impulses and disturbance waves, biasing means controlled by said disturbance waves for applying to the grid of said amplifier a negative biasing potential varying in amplitude in accordance with amplitude variations of said disturbance waves, said biasing means being also effective to apply to the grid of said amplifier a negative biasing impulse for each signal impulse received by said input circuit, and means for making said biasing means selective, said selective means including two opposing cathodes having inter-related circuits whereby one of said cathodes increases and the other decreases the grid bias of the amplifier, the selective operation of the cathodes depending upon the relative strength and duration of the signal impulses and disturbance waves for a given time period.

4. In signal receiving apparatus, a receiver circuit including an amplifier for amplifying signal impulses and disturbance waves, an output circuit for said amplifier consisting of two branches for applying variable negative bias to the grid of the amplifier, one of said branches including rectifying means adapted to provide direct current voltage proportional to the amplitude of the disturbance waves, the other of said branches including control means actuated by the signal impulses received by the input circuit, said branch circuits being so related as to provide inter-dependent selective control of the bias on the grid of the amplifier, the selectivity being effected by delaying the action of signal impulses for a time period substantially equal to the duration of the received signal impulse.

ROBERT WELLENSTEIN.
WERNER HOLLE.
MARTIN SCHUMACHER.